United States Patent [19]

Paradis

[11] Patent Number: 4,671,077
[45] Date of Patent: Jun. 9, 1987

[54] ICE-MAKER HEAT PUMP USING WATER SUPERCOOLING

[76] Inventor: Marc A. Paradis, 3310 Monnerie, Apt. 3, Ste-Foy, Quebec, Canada

[21] Appl. No.: 765,119

[22] Filed: Aug. 13, 1985

[51] Int. Cl.[4] ............................................. F25B 13/00
[52] U.S. Cl. ...................................... 62/324.1; 62/59; 62/66
[58] Field of Search ..................... 62/59, 66, 67, 340, 62/348, 98, 324.1

[56] References Cited

U.S. PATENT DOCUMENTS 4,401,449 8/1983 Martin et al. ........................... 62/59

OTHER PUBLICATIONS

Ice Maker Heat Pump Systems, National Research Council of Canada.
Ashrae Journal 5/1985, Reardon et al., pp. 24–29.
Investigation of Freezing of Supercooled Liquid; Arora et al., Heat Mass Transfer, vol. 16, pp. 2077–2085, 1973.
Ice Maker Heat Pump; Refrigeration Service & Contracting, 1/1977, vol. 45, #1; Fischer.

Primary Examiner—William E. Wayner

[57] ABSTRACT

A heat pump system comprising a lower temperature heat exchanger and a higher temperature heat exchanger. The lower temperature heat exchanger is connected to a water supply circuit having a reservoir, the improvement in the system comprising the water flowing through the low temperature heat exchanger capable of being cooled to a quasi-stable supercooled liquid state at temperatures below 0° C. Part of the supercooled liquid water flowing from the lower temperature heat exchanger is transformed to ice upon contact with the water in the reservoir. That phase change can be utilized as the source of energy for the heat pump. The heat pump can be used for heating. The cold water/ice mixture can be used for space cooling. The ice obtained by this process is in the form of small ice crystals and can be utilized for separate applications of the system.

23 Claims, 7 Drawing Figures

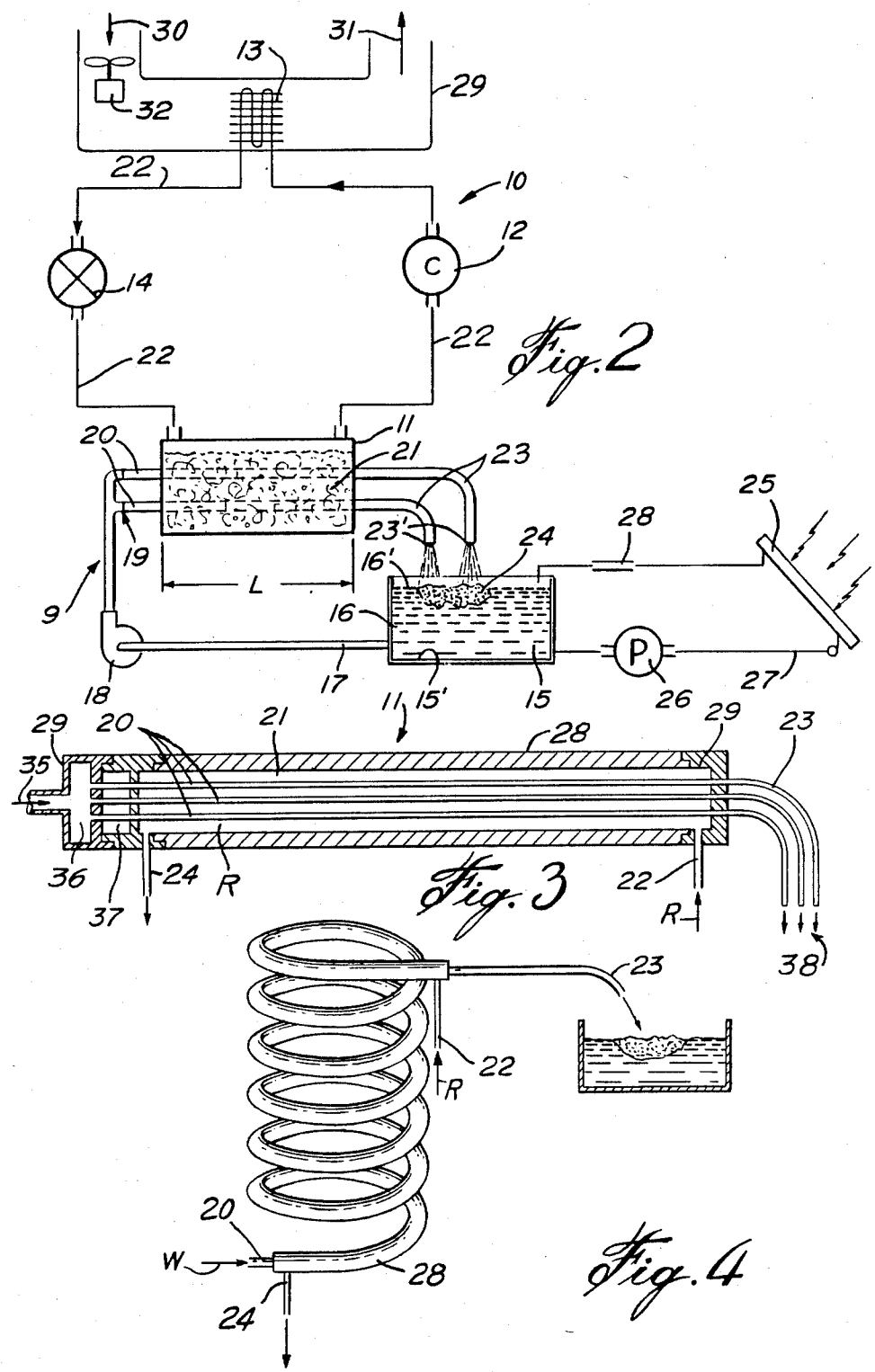

ICE-MAKER HEAT PUMP USING WATER SUPERCOOLING

BACKGROUND OF INVENTION

The present invention relates to a heat pump system having a heat exchange circuit wherein a water supply circuit is connected to the cold side thereof with the water in the supply circuit being capable of being supercooled to temperatures below 0° C.

A heat pump is a machine capable of extracting energy from a source at a certain temperature and transferring it to a sink at a higher temperature. It thus can be said that the machine has a "cold side" and a "hot side".

Different types of heat pumps exist: absorption heat pumps, chemical heat pumps, thermoelectrical heat pumps, vapor compression heat pumps, etc. All of these machines need a heat source from which energy can be extracted. That source can be any medium: air, water, ground, etc. The heat sink of the machine can also be any medium.

If the purpose for using the heat pump is to cool a medium, the machine is usually called a refrigeration or a conditioning system. If instead, heating a medium is desired, the machine is simply called a heat pump. It can be noted that the same machine can also have two functions, like cooling the air in a house (cold side) while at the same time heating a swimming pool (hot side), while the heat extracted from the house.

In the particular case where the heat source for the machine is water, the reason for using the heat pump can be to obtain cold water for conditioning purposes; it can also be to fabricate ice which has a large number of uses. Since that phase change (liquid to solid) liberates a large quantity of energy (335 kJ/kg), it can also be regarded as a very large source of heat for the cold side of the heat pump; the heat which is then produced on the hot side can then be used for different purposes, like space heating. A heat pump capable of fabricating ice is usually called an Ice Maker Heat Pump (IMHP).

DESCRIPTION OF PRIOR ART

An IMHP is basically a heat pump unit that extracts energy from water by freezing the liquid to ice. One example of this concept is the Annual Cycle Energy System (ACES) in which ice, fabricated during winter as a source of energy for heating a building, is used for air-conditioning purposes in summer. Another possibility is the fabrication of ice at night (i.e. during off-peak hours), for air-conditioning purposes in day time.

A large number of references exist on the subject of IMHP, and the problems associated with their use are well known. Reference is made, for example, to an article entitled "Ice-maker heat pump systems: Review of current technology", SED Systems Ltd, Saskatoon, Canada, 1978, Doc. no 088400-TR-101; Contract for NRC Building Research division. Indeed, the IMHP technology has not changed much during the last 30 years. The three basic types, distinguished by the type of low side heat exchanger arrangement used, are still:

(1) the coil (or plate) in bin arrangement, direct heat exchange type (2) the coil (or plate) in bin arrangement, indirect heat exchange type (3) the plate above bin system, for which periodic ice harvesting is necessary.

One of the latest examples of the first type is described in detail in an article entitled "An ice-making showcase" by Reardon J. G. et al., ASHRAE Journal, May 1985, pp. 24–29. In that application, the IMHP has cut the electrical demand for summer cooling in a building by more than 50%.

For different reasons, the three types of existing IMHPs still have a relatively low average coefficient of performance, the two first ones mainly because of heat transfer problems, the latter mainly because of the inherent problems associated with ice harvesting. They all are costly to build and can only be justified economically for large applications.

The use of water supercooling will permit better performance and lower costs. Relatively little experimental work has been done on the phenomenon of water supercooling, although it has been known to exist for a long time. In a book entitled "Properties of Ordinary Water-Substance" (Hafner Publ. Co., New York 1968), N. E. Dorsey defines the phenomenon the following way: "Under suitable conditions, water can be cooled below its so-called freezing point (the melting point of ice) without becoming solidified. In that state, it is said to be supercooled. If a bit of ice, no matter how minute, be touched to supercooled water, freezing on the surface of the ice begins at once, and proceeds rapidly until enough latent heat has been freed to raise the temperature to the so-called freezing point. It then stops unless heat is being abstracted from the mixture." In the same book (p. 640), Dorsey makes a reference to an article by A. Mousson, published in 1859, where it is said that certain conditions appeared to favor water supercooling; one of these conditions is when water is inside narrow capillary tubes.

Only two publications could be found on the flow of supercooled water inside circular tubes: one by Arora A. P. S. et al. entitled "An investigation of the freezing of supercooled liquid in forced turbulent flow inside circular tubes", (Int. J. Heat Mass Tr., Vol. 16, pp. 2077–2085, November 1973) and another one by Mukushi, T. et al. entitled "Supercooling of liquids in forced flow in pipes and the growth of ice crystals". (Hitachi Research Laboratory, Hitachi Ltd. Scripta Publishing Co., 1982).

FIELD OF THE INVENTION

The field of this invention covers all types of heat pumps, used for any purpose such as heating of a medium, cooling of a medium, fabrication of ice, desalination of water, etc. and employing the phenomenon of water supercooling either continuously or part of the time of operation. There is no limitation as to the purity of the water used.

SUMMARY OF INVENTION

The present invention relates to heat pumps of any type having water as a low side heat source. The main feature of the new heat pump is its capacity to extract heat from that liquid water even when the temperature of the said water is as low as 0° C. while the water leaving the low side heat exchanger remains in the liquid state at temperatures well below 0° C., i.e. in a supercooled state. Normally unstable, that state can be rendered quasi-stable by proper heat exchanger design. If that water is sent to some sort of reservoir, the contact with any part of that reservoir will change the state of the outcoming water, and separation into a solid part and a liquid part will occur until the mixture is back at 0° C. This corresponds to about 1.25% of solid particles per degree Celsius of supercooling. The number of degreees of supercooling is controlled by the characteristics of the heat exchanger. Temperatures of −5° C. have been obtained in the inventor's laboratory, but calculations tend to show that much lower temperatures are possible at the exit of the low side heat exchanger.

The structure of the resulting ice is that of fine separate crystals. That ice in "slush" form will float at the reservoir water surface. If needed, the resulting liquid-ice mixture can then be circulated in a properly designed pump and piping system.

Instead of being sent to a reservoir, the outcoming water can be sent through a fine mesh screen; the ice crystals will still be formed and accumulate in the screen while the liquid part will go through the mesh. In that way, liquid and solid can easily be separated.

Because of its capacity to fabricate ice, that new heat pump will be called, like those of more conventional types, an IMHP. Its main advantages over the existing IMHPs are:

the low side heat exchanger does not have to be located inside of a reservoir, like in types 1 and 2 mentioned above;

the low side heat exchanger does not have to be located above a reservoir, like in type 3;

water destined to the low side heat exchanger, arriving at a temperature of 0° C. or above, can be circulated with an ordinary circulating pump;

the low side heat exchanger is as simple or simpler to manufacture than standard heat exchangers;

the ice is formed on a continuous basis and the heat pump cycle never has to be stopped for harvesting. Indeed, there is a continuous harvesting of the ice;

since no ice is formed inside or on the surface of the heat exchanger itself, the heat exchange is more efficient and the machine performance is higher than that of other IMHPs;

ice is fabricated in the form of small ice crystals.

That last advantage is very significant. Other IMHPs fabricate small or large blocks of ice. The small crystals fabricated with the new invention are of pure solid water even when made from polluted or salted liquid water. This fact opens up many possibilities, as will be described later.

Moreover, when warm water has to be cooled, like in air-conditioning "chiller" systems, the process is more efficient if the new invention is used. Indeed, with the new invention, the warm water only has to be fed at the top of a reservoir containing a mixture of liquid water and ice crystals. Liquid water at 0° C. can then be pumped out from the bottom of the reservoir.

Another advantage of ice in small crystal form is its smoothness to the touch. This makes it more suitable for many applications as will be described later.

Like with other IMHPs, the rate of formation of the ice can be modulated at will, by using any of the usual methods of capacity modulation.

According to a further broad aspect of the present invention, there is provided a heat pump system having a heat exchange circuit including a hot side and a cold side, and having a hot side heat exchanger (HSHE) and a cold side heat exchanger (CSHE). The CHSE is connected to a water supply circuit. The improvement in the system is comprised in that the water supply is provided with conduit means through which water flows. The conduit means has a very small internal diameter as compared to its length whereby the water is capable of being supercooled on a continuous basis by the cold side heat exchanger to a quasi-stable state at temperatures well below 0° C.

BRIEF DESCRIPTION OF DRAWINGS

A preferred embodiment of the present invention will now be described with reference to the examples thereof illustrated by the accompanying drawings.

FIG. 2 is a schematic diagram of a solar assisted ice-maker heat pump, also based on the present invention;

FIG. 3 is a simplified and partly sectioned view of one form of an evaporator for supercooling water;

FIG. 4 is another simplified partly sectioned view of another evaporator constructed in accordance with the present invention;

FIG. 5a is a cross-section of a centrifugal ice separator; and

FIG. 5b is a section view along section lines A—A of FIG. 5a.

DESCRIPTION OF PREFERRED EMBODIMENTS

1. Air-conditioning system with ice storage

It will be assumed here for the sake of simplicity that the type of heat pump used is the more common vapor compression system, featuring four basic components (a compressor, a condenser, an expansion device and a evaporator) and a certain number of other components depending on the specific application.

Figure 1A:
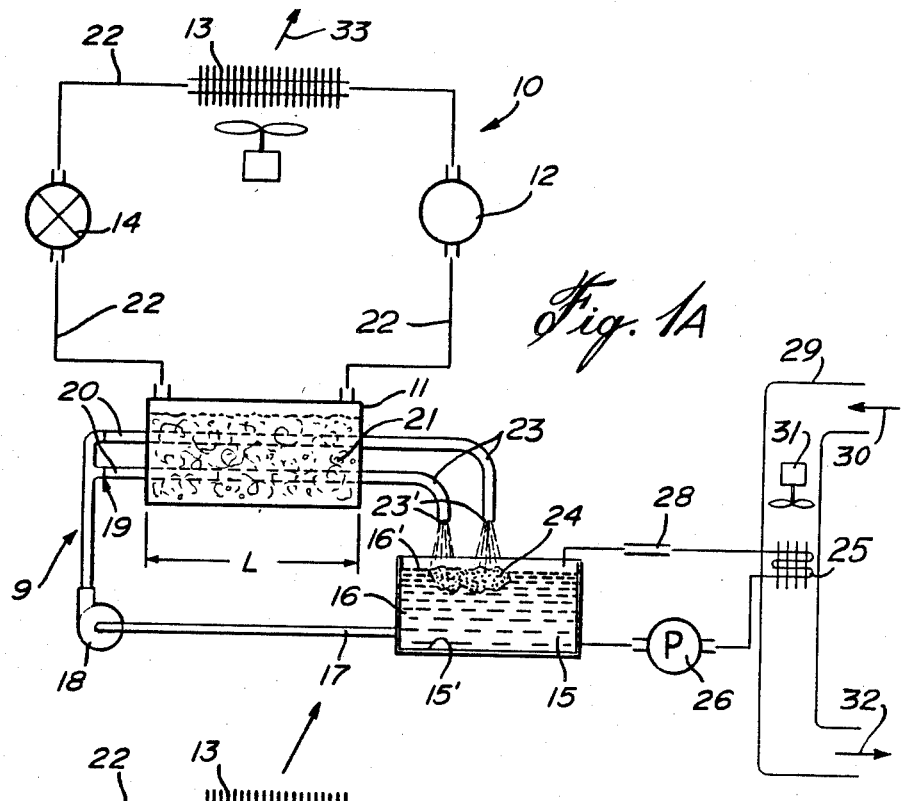
FIGS. 1A and 1B are schematic diagrams of an air conditioning system with ice storage based on the present invention.
Figure 1B:
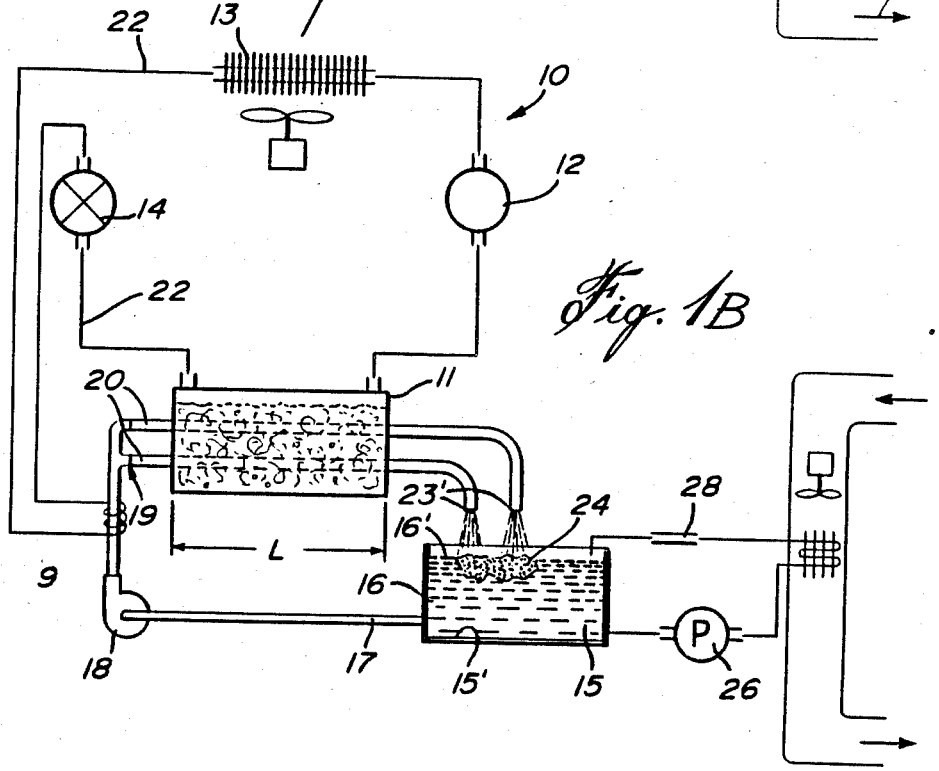

Referring to FIGS. 1A and 1B, there is shown a schematic diagram of one of the systems covered by the present invention, as utilized with a mechanical vapor compression heat pump device. The heat pump is used as part of an air-conditioning system and is schematically illustrated by the heat exchange circuit 10 comprising an evaporator 11, a compressor 12, a condenser 13 and an expansion device 14. As herein shown, the evaporator 11 is constructed in accordance with the present invention and is connected to a water supply circuit 9 having a reservoir 15 containing a volume of water 16 therein. An outlet conduit 17 is connected adjacent to the bottom wall 15' of the reservoir 15 and connects to a pump 18 which pumps the water from the bottom of the reservoir to an inlet 19 of evaporator conduit means, herein constituted by one or more straight conduits 20 extending through the evaporator 11 and in indirect contact with liquefied refrigerant 21 therein, through the walls of the tubes 20. Accordingly, the refrigerant evaporates and then flows through the circuit conduits 22 of the heat exchange circuit 10, towards the compressor 12.

The refrigerant in circuit 10 can be any of the pure substances (halocarbons or others) usually used in the refrigeration industry (like R-12, dichlorodifluoromethane), azeotropic mixtures of those pure substances, (like R-502, which is a mixture of R-22 and R-115) and also non-azeotropic mixtures of those said pure substances or of those azeotropic mixtures (like R-12/R-114 mixtures).

Water arriving at inlet 20 of evaporator 11 must be completely free of ice crystals. That can be done by filtering water with fine mesh screen before the water leaves reservoir 15 through outlet 17. An extra heat exchanger could also be added for that purpose which would pick up heat from hot refrigerant conduit between condenser 13 and expansion device 14 and deliver the heat to water in conduit means 9.

The evaporator conduit 20 has an arcuate outlet section 23 having discharge ends 23' disposed above the water level 16' of the reservoir 15. The water passing through the evaporator conduits 20 is eventually supercooled by the evaporator 11 and released in the water in the reservoir 15. Upon hitting the surface 16' of the water in the reservoir 15, or blocks of ice crystals floating thereon, or any other object in its path, some of the supercooled water will solidify and form ice crystals 24.

That ice 24 can be fabricated at night, during off-peak hours, and also during day time if needed. The energy picked up by the refrigerant 21 in the evaporator 11 plus the outside energy given to the compressor 12 are released to an outside heat sink 33 which can be, for example, the atmosphere. The heat transfer rate to the heat sink 33 can be increased by using fan 34.

The reservoir 15 is also connected to a water-to-air heat exchanger 2 located inside an air conduit 29 of the building to be air-conditioned. During day time, the cold water at the bottom of the reservoir 15 is circulated by pump 26, via the outlet pipe 27, to the heat exchanger 25 and back into the reservoir through the inlet conduit 28. The warm air 30 inside the building enters the conduit 29, sucked by fan 31, goes through heat exchanger 25 and comes out as cool air 32 which is sent back to the space to be conditioned. Water from outlet conduit 28, having absorbed heat in exchanger 25 from warm air 30, is at a temperature above 0° C., so that ice 24 will slowly melt during day time. New ice 24 can then be fabricated during the following night.

In such a system, the fact that the water arriving at the heat exchanger 25 is at a temperature of 0° C. is important. This permits, for example, a significant reduction in area for the heat exchanger 25, and consequently a large reduction in price of that expensive part, common to all air-conditioning systems.

2. Solar assisted ice-maker heat pump system

Referring to FIG. 2, there is shown a schematic diagram of another of the systems covered by the present invention, as utilized again with a mechanical vapor compression heat pump device. The said heat pump is used as part of a space heating system and is illustrated by the heat exchange circuit 10 comprising an evaporator 11, a compressor 12, a condenser 13, and an expansion device 14.

The condenser 13 will normally be located in a pulsed air conduit 29. Cool air 30 arriving from the space that needs heating is circulated by fan 32 through hot condenser 13. The air 31 leaving the duct is warm and can keep the space comfortable.

The reservoir and the evaporator serve the same purpose as in the first application described above and can thus be built the same way. But in this particular application, the ice 24 fabricated by the heat pump device will have to be melted, unless some use is found for it. It can be melted by circulating the water 16 in the reservoir 15 through a solar collector 25 using a pump 26. When present, sun rays 31 will heat up water flowing through conduit 27. The water in return conduit 28 will thus be at a higher temperature and be able to melt ice 24. The fact that water in conduit 27 is at or near 0° C. makes the solar collector 25 very efficient.

In areas where sun is not present very often but where the outside air temperature during the day is normally above 0° C., the solar collector can be replaced with a simple water to air heat exchanger, helped or not by an air circulating fan.

Referring now to FIG. 3, there is shown an example of construction of the cold side heat exchanger 11 of the invention. As herein shown, the evaporator 11 is comprised of an elongated cylindrical tube 28 containing the refrigerant fluid therein. A plurality of inner tubes 20 extend through the interior of the tube 28 and are in contact with the refrigerant fluid therein. Liquid refrigerant enters the conduit 28 through the inlet tube 22 and evaporated refrigerant leaves through tube 24. Water 35 arriving from reservoir at a temperature of 0° C. or above enters a tranquilization chamber 36 before entering the tubes 20 where the water is to be cooled. An air chamber 37 isolates thermally the almost stagnant water in chamber 36 from the cold refrigerant 21 in order to prevent freezing of the water in chamber 36. The supercooled water 38 exits from the outlet end 23 of the tubes which are disposed in an arcuate shape whereby not to disturb the flow of the relatively unstable supercooled water 38.

In one of the models constructed and successfully tested, the interior diameter of the tubes 20 was 3 mm, the length of the tubes 20 exposed to refrigerant 21 was 2000 mm and the outlet temperature of the supercooled water 38 was about $-3°$ C. Excellent heat pump performance was obtained.

The evaporator 11 shown in FIG. 4 is of a different configuration and is provided simply to illustrate that instead of a plurality of tubes 20, it is possible to utilize a single larger tube 20 but having a longer span within the outer tube 28 which would herein be formed as a coil. The arcuate disposition of such a tube 20 would ensure undisturbed flow of the supercooled liquid therein and thus prevent freeze-up.

The refrigerant flow in evaporator 11 can be inthe same direction as the water flow. It can also be in the opposite direction, like in the cases of FIGS. 3 and 4.

Other configurations of evaporators 11 are possible. The flooded type, which is frequently used in the refrigeration industry, is an example. The liquid overfed type is another example.

The chemical heat pumps, on which a lot of research is being done at the moment, might feature types of cold side heat exchangers that are quite different from anything that exists today. Like, for example, solid/liquid CSHEs. If they are used to fabricate supercooled water, they will be within the scope of the present invention.

3. Other applications of the invention

The invention can be used effectively as an Annual Cycle Energy System (ACES), in which the ice fabricated during the cold season for heating purposes is stock-piled in large reservoirs for later use for air-conditioning purposes during the warmer season.

That invention can also be used instead of conventional water source heat pumps for heating buildings in winter. One of the disadvantages of those presently known is the fact that they cannot function safely with water below $+5°$ or $+6°$ C. because of the possibility of ice-up and damage to the low side heat exchanger. With the invention, any river or lake with liquid water can become a source of heat, no matter the temperature of the water.

Another important application of the invention is to use the heat pump system to desalinate ocean water. The samll ice crystals fabricated with the invention are of pure solid water, even when made from polluted or salted liquid water. Salt water can be fed to the reservoir 15 and the ice 24 removed by a suitable separation and collection means. As shown in FIGS. 5a and 5b, the collection system could consist of a rotating drum 60 made of fine mesh screen installed in the reservoir 15 with a portion 60' of the drum extending above the water surface 16' thus transferring the floating ice to an external conveyor 61. Centrifugation of the ice crystals could complete the liquid-solid separation.

The ice crystals formed with the supercooled water may also be utilized for other applications. For example, this "soft ice" is ideal for packaging and preserving fish. The crushed ice used at the moment in fishing boats has sharp cutting edges which damage the fish and reduce its quality. The soft ice is also ideal for the preservation of certain vegetables.

Furthermore, the ice could be used for making "slush" drinks, as is popular with children, by adding flavor to the slush ice.

Another use for such soft ice is in the emergency rooms of hospitals where the ice could be used to treat skin burns or placed on broken limbs.

It is within the ambit of the present invention to cover any obvious modifications of the examples of the preferred embodiment described herein, provided such modifications fall within the scope of the appended claims.

I claim:

1. A heat pump system having a heat exchange circuit including a hot side and a cold side and having a hot side heat exchanger (HSHE) and a cold side heat exchanger (CSHE), said CSHE being connected to a water supply circuit, the improvement wherein said CSHE is provided with conduit means through which water flows, a cooling refrigerant externally of said conduit means and in contact therewith, said conduit means having a very small internal diameter as compared to its length whereby said water is capable of being supercooled in its quasi-stable liquid state to temperatures below 0° C. and on a continuous basis in said conduit means of said cold side heat exchanger said conduit means having an isolated area immediately upstream of said cooling refrigerant to thermally isolate said water from said cooling refrigerant to prevent freezing of said water prior to entry into said conduit means in contact with said refrigerant, and wherein said conduit means has an outlet disposed above the water level of a reservoir whereby supercooled water will be released above said water level and a percentage of said supercooled water will form ice crystals only when arriving in contact with water in said reservoir or any object in the path of said released supercooled water.

2. A heat pump system as claimed in claim 1 wherein said water supply circuit further comprises an outlet conduit connected to a lower portion of said reservoir, pump means in said outlet conduit, said outlet conduit being connected to an inlet of said CSHE conduit means.

3. A heat pump system as claimed in claim 2 wherein another heat exchanger is located in said water supply circuit between said reservoir and said CSHE conduit means so as to make sure that water arriving in CSHE is heated at a temperature slightly above 0° C. and is thus free of ice crystals.

4. A heat pump system as claimed in claim 2 wherein said pump means causes said water to flow through said water conduit means at a predetermined flow rate, either fixed or controlled as a function of the said heat pump capacity.

5. A heat pump system as claimed in claim 2 wherein said outlet of said water conduit means comprises a smoothly curved section of a plurality of tubes.

6. A heat pump system as claimed in claim 2 wherein said outlet of said water conduit means comprises a straight section of a plurality of tubes.

7. A heat pump system as claimed in claim 2 wherein said reservoir is a large insulated reservoir whereby ice fabricated by said heat pump during winter heating is used for summer cooling.

8. A heat pump system as claimed in claim 1 wherein there is further provided ice separation and collecting means for removing said ice crystals from said reservoir.

9. A heat pump system as claimed in claim 8 wherein said separation and collection means comprises a centrifugal drive connected above the water level of said reservoir.

10. A heat pump system as claimed in claim 8 wherein said water in said reservoir is salt water, there being further provided ice separation and collecting means for recovering said ice which is in the form of small ice crystals and which is free of salt content whereby said heat pump and said water supply circuit and said ice collecting means also act as a water desalination system.

11. A heat pump system as claimed in claim 1 wherein said reservoir is connected to an auxiliary heat exchanger to warm said water in said reservoir to prevent freeze-up of the entire volume of water within said reservoir and thus provide a continuous source of heat for said heat pump system.

12. A heat pump system as claimed in claim 11 wherein said auxiliary heat exchanger is a solar panel system having control means to control collection of solar heat.

13. A heat pump system as claimed in claim 1 wherein said CSHE comprises a refrigerant fluid chamber, said water conduit means comprising a plurality of straight tubes extending across said chamber.

14. A heat pump system as claimed in claim 1 wherein said CSHE comprises a refrigerant fluid chamber, said water conduit means comprising a plurality of smoothly curved tubes extending across said chamber.

15. A heat pump system as claimed in claim 1 wherein said CSHE comprises a coiled tubular refrigerant chamber, said water conduit means comprising a tube disposed concentrically within said refrigerant chamber.

16. A heat pump system as claimed in claim 1 whereby the heat exchange circuit comprises a refrigerant circuit wherein the said refrigerant is alternately compressed and expanded, boiled and condensed, thereby forming a mechanical vapor compression system capable of supercooling water.

17. A heat pump system as claimed in claim 16 wherein refrigerant in said refrigerant circuit is a non-azeotropic mixture of refrigerants.

18. A heat pump system as claimed in claim 1 wherein said water in said reservoir is polluted water, there being further provided ice separation and collecting means for recovering said ice which is in the form of small ice crystals and which is free of pollutants whereby said heat pump, said water supply circuit and said ice collecting means act as depollution system.

19. A heat pump system as claimed in claim 1 wherein said reservoir is connected to a water-to-air heat exchanger through which said cold water in said reservoir is circulated, said heat exchanger being located inside a building air conduit, said air being cooled and conditioned by said heat exchanger.

20. A heat pump system as claimed in claim 1 wherein said HSHE is located inside an air conduit, whereby said air is heated, thus providing an air heating system.

21. A heat pump system as claimed in claim 1 wherein said HSHE is connected to a fluid supply circuit, whereby said fluid is heated, thus providing a fluid heating system.

22. A heat pump system as claimed in claim 19 wherein said fluid is water, thus providing a water heating system.

23. A heat pump system as in claim 1 wherein said isolated area is a tranquilization chamber upstream of said externally cooled conduit means and an air chamber intermediate said tranquilization chamber and said conduit means in contact with said refrigerant.

* * * * *